B. E. MARSHALL.

LUBRICATOR FOR ELEVATOR GUIDES.

APPLICATION FILED AUG. 28, 1913.

Reissued Dec. 30, 1913. 13,664.

Witnesses:

Carl L. Choate.

Horace A. Crossman

Inventor:

Bertice E. Marshall, by Emery, Booth, Jenney & Varney

Attys.

COLUMBIA PLANOGRAPH CO., WASHINGTON, D. C.

UNITED STATES PATENT OFFICE.

BERTICE E. MARSHALL, OF NEW YORK, N. Y., ASSIGNOR, BY MESNE ASSIGNMENTS, TO DWIGHT F. KILGOUR, OF LEXINGTON, MASSACHUSETTS.

LUBRICATOR FOR ELEVATOR-GUIDES.

13,664. Specification of Reissued Letters Patent. Reissued Dec. 30, 1913.

Original No. 1,000,532, dated August 15, 1911, Serial No. 573,220. Application for reissue filed August 28, 1913. Serial No. 787,235.

*To all whom it may concern:*

Be it known that I, BERTICE E. MARSHALL, a citizen of the United States, residing at New York, in the county and State of New York, have invented certain new and useful Improvements in Lubricators for Elevator-Guides, of which the following description, in connection with the accompanying drawings, is a specification, like letters on the drawings representing like parts.

My invention relates to lubricators for elevator guides.

The object of the invention is to provide a simple and effective lubricator for the guides of elevators, in which the reservoir of the car or platform is mounted so as to normally cause the spout at its upper portion to lie close to the guide; a further object is to prevent the reservoir from swinging too far in either direction when subjected to sudden jars. These objects I accomplish by the construction shown in the accompanying drawing, in which—

Figure 1:
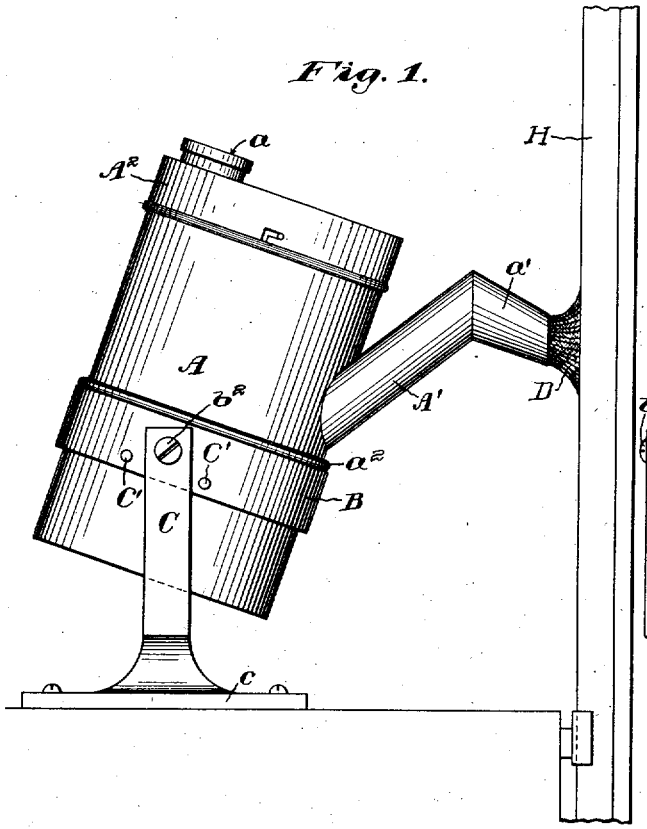
Figure 2:
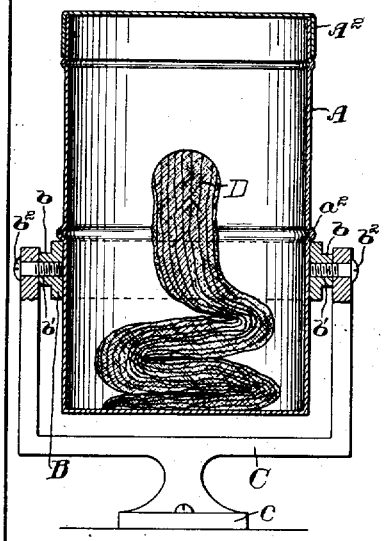
Figure 3:
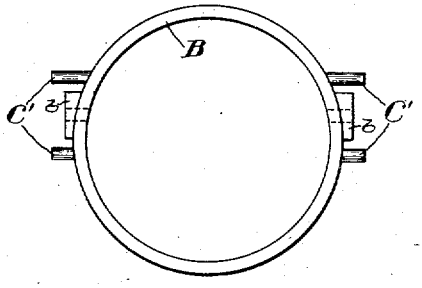

Figure 1 is a side elevation of my improved lubricator in position; Fig. 2 is a detail sectional elevation; Fig. 3 is a plan of supporting ring.

A, designates the reservoir provided with a filling opening at its top having a cap or closure $a$, and the reservoir is further provided with an outlet spout A′ extending upwardly and outwardly and terminating in a tapering nozzle $a'$ extending adjacent to the elevator guide H. The reservoir A, is provided below its middle with an annular supporting rib $a^2$ which rests upon the upper edge of a supporting ring B within which the reservoir is removably mounted.

The ring B is provided at opposite sides with lugs $b$ having threaded apertures $b'$ to receive the inner ends of the pivot screws $b^2$, which pass through apertures in the upper ends of the arms of the supporting stand C. This stand C is in the form of a yoke having a supporting base $c$ through which attaching screws pass into the top of the elevator car. The ring B, is pivoted to one side of its center as shown in Fig. 1, so as to cause the upper end of the reservoir A to swing by gravity control normally toward the guide H or other member to be lubricated. The ring B is further provided at opposite sides of its pivots with lugs C′ C′ between which the upper ends of the arms of stand or support C extend. The swinging movement of the reservoir is thus limited to the proper extent and all necessary play allowed for. The lubricator is applied to the guide by means of a swab D, preferably in the form of a wick which is long enough to coil within the bottom of the reservoir. The wick is securely held against inward movement by the contracted nozzle $a'$, as the wick will naturally expand beyond the nozzle sufficiently to prevent it from being forced back therethrough.

The wick absorbs the oil and conveys it to the outer exposed portion which is in contact with the guide. Since a substantial part of the weight of the reservoir is borne by the stand C independently of the guide, the wick is properly pressed to distribute a thin film of oil thereon, thus insuring an economical use of oil. When not in use the reservoir may be tilted back.

When the upper end of the reservoir is tilted back its center of gravity will lie outside or to the left of the pivot screws $b^2$ and the outer lugs C′ will rest against the outer edges of the standard or support C. Normally however the center of gravity of the reservoir will lie inside or to the right of the pivot screws $b^2$ as in Fig. 1.

The reservoir may be cleaned and a new wick added by removing its top $A^2$.

What I claim is:

1. The herein described lubricator for elevator guides comprising a stand or support, and a swinging reservoir pivoted between its ends to said support to normally swing outwardly by gravity at its upper end toward the guide to be lubricated, and provided with a discharge spout.

2. The herein described lubricator for elevator guides comprising, a stand or support, a swinging reservoir pivoted between its ends to said support to normally swing outwardly by gravity at its upper end toward the guide to be lubricated, and provided with an upwardly and outwardly extending discharge spout, and a swab wick carried by the spout.

3. The herein described lubricator for elevator guides comprising a stand or support, and a swinging reservoir pivoted between its ends to said support to normally swing outwardly by gravity at its upper end toward the guide to be lubricated, and provided with an upwardly and outwardly extending discharge spout terminating in a contracted nozzle, and a swab-wick held in said spout and nozzle.

4. The herein described lubricator for elevator guides comprising, a stand or support, a swinging reservoir having a discharge spout and mounted to normally swing outwardly at its upper end to bring its spout next to the guide to be lubricated, and stops to limit the swinging movement of the reservoir.

5. A lubricator for elevator guides comprising a stand or support, a ring pivoted to one side of its center therein, and a reservoir supported in the ring and having its discharge spout normally held thereby adjacent to the guide to be lubricated.

6. A lubricator for elevator guides comprising, a stand or support, a ring pivoted to one side of its center and provided with stops to limit its swing, and a reservoir mounted in the ring with its discharge spout normally held thereby adjacent to the guide to be lubricated.

7. A lubricator for elevator guides, comprising a forked stand, a ring pivoted to one side of its center in the upper end of said fork, and provided at opposite sides of a fork arm with stops to limit its swinging movement, and a reservoir mounted in the ring and having an annular rib or shoulder resting on top of the ring, and a discharge spout extending upwardly and outwardly toward the guide to be lubricated.

8. A lubricator comprising in combination, a support, and a reservoir mounted thereon and provided with a wick outlet for a lubricating wick extending upward from said reservoir and with provision for moving said reservoir by gravity control to press said wick against a member to be lubricated, said support and reservoir having provision for causing the former to bear a substantial part of the weight of the reservoir independently of said member.

9. A lubricator comprising in combination, a support, and a reservoir fulcrumed thereon and provided with a wick outlet for a lubricating wick leading upward from said reservoir and with provision for rocking the reservoir laterally by gravity control to press the wick against a member to be lubricated, said support and reservoir having provision for causing the former to bear a substantial part of the weight of the reservoir independently of said member.

In witness whereof, I have signed my name to this specification in the presence of two subscribing witnesses.

BERTICE E. MARSHALL.

Witnesses:

CHAS. J. F. BOHLEN,
M. WHITTEMORE.

Copies of this patent may be obtained for five cents each, by addressing the "Commissioner of Patents, Washington, D. C."